United States Patent [19]

Haraguchi

[11] Patent Number: 4,925,207
[45] Date of Patent: May 15, 1990

[54] REAR SUSPENSION OF VEHICLE CONTROLLABLE OF ROLLING UNDER BRAKING AND DRIVING

[75] Inventor: Tetsunori Haraguchi, Susono, Japan

[73] Assignee: Toyota Jidosha Kabushiki Kaisha, Aichi, Japan

[21] Appl. No.: 339,120

[22] Filed: Apr. 17, 1989

[30] Foreign Application Priority Data

Apr. 19, 1988 [JP] Japan .................................. 63-95997

[51] Int. Cl.$^5$ ................................................ B60G 3/18
[52] U.S. Cl. ..................................... 280/690; 280/675
[58] Field of Search ............... 280/675, 673, 690, 691, 280/696, 701, 688

[56] References Cited

U.S. PATENT DOCUMENTS 3,189,118  6/1965  Arning .................................. 180/73

FOREIGN PATENT DOCUMENTS 2355588  5/1975  Fed. Rep. of Germany .
50-86027  11/1975  Japan .
61-50817  3/1986  Japan .
2202197  9/1988  United Kingdom .

OTHER PUBLICATIONS

David Scott & Jack Yamaguchi, "International Viewpoints", Automotive Engineering, vol. 91, (1983) Mar., No. 3 Dallas, Tx.

Primary Examiner—Charles A. Marmor
Assistant Examiner—Karin Tyson
Attorney, Agent, or Firm—Oliff & Berridge

[57] ABSTRACT

A rear suspension of a vehicle such as an automobile having a plurality of links pivotably connected between the vehicle body and a wheel supporting member to transmit driving and braking forces therebetween while allowing bounding and rebounding movement of the wheel supporting member relative to the vehicle body, wherein the links are arranged to specify a first trace of movement of a center of rotation of the wheel and a second trace of movement of a momentary ground contact point on the wheel according to bounding and rebounding of the wheel so that, as seen in a side view of the vehicle, the point of intersection between a normal line drawn to the first trace of movement and a normal line drawn to the second trace of movement shifts from its standard position corresponding no bounding and no rebounding of the wheel forward and upward along with bounding of the wheel and rearward and downward along with rebounding of the wheel.

10 Claims, 10 Drawing Sheets

REAR SUSPENSION OF VEHICLE CONTROLLABLE OF ROLLING UNDER BRAKING AND DRIVING

BACKGROUND OF THE INVENTION

1. Field of the Invention

The present invention relates to a rear suspension of a vehicle such as an automobile, and more particularly, to a rear suspension for mounting a rear wheel to a vehicle body in a manner of transmitting driving and braking forces therebetween while allowing bounding and rebounding of the rear wheel relative to the vehicle body.

2. Description of the Prior Art

In a vehicle such as an automobile in which a vehicle body is supported on a pair of front wheels and a pair of rear wheels via individual resilient suspension mechanisms, since the center of gravity of the vehicle body is generally above the center of pitching and the center of rolling of the vehicle body, when the vehicle is accelerated the vehicle body pitches rearward so as to lift its front portion and to lower its rear portion, and when the vehicle is braked the vehicle body pitches forward so as to lower its front portion and to lift its rear portion. The former phenomenon is generally called "squatting" and the latter phenomenon is generally called "nose diving". Further, when the vehicle is turning around a corner or along a curved road, the vehicle body rolls sidewardly so that the wheels on the outside of the turning bound and the wheels on the inside of the turning rebound relative to the vehicle body. The squatting and the nose diving are generally uncomfortable to the driver and passengers, and lower the riding quality of the vehicle. The rolling is also generally uncomfortable to the driver and passengers, and also lowers the riding quality of the vehicle. However, if the rolling is too much suppressed by certain suspension control in turning of the vehicle, particularly in turning under braking, the vehicle is apt to spin.

Figure 1:
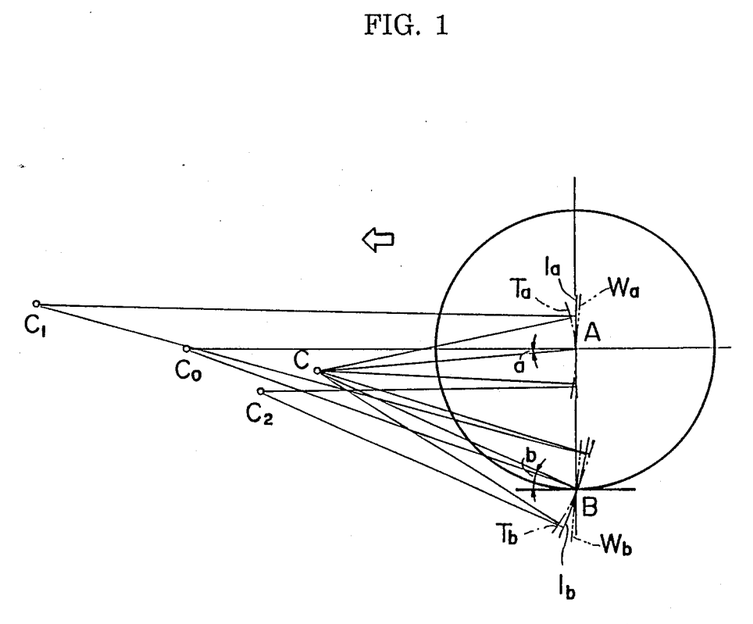
FIG. 1 is a diagram illustrating the behavior of a wheel mounted to a vehicle body by the conventional double wishbone type suspension, the conventional trailing arm type suspension, and the suspension according to the present invention, in the bounding and rebounding of the wheel relative to the vehicle body.

In the conventional double wishbone type suspension, a wheel supporting member such as a spindle or an axle bearing moves along a straight line as seen in a side view of the vehicle in the bounding and rebounding of the wheel relative to the vehicle body. In the conventional trailing arm type suspension, the wheel supporting member moves about a pivot point of the suspension arm positioned on the front side of the center of rotation of the wheel and generally at substantially the same level as or slightly lower than the center of rotation of the wheel. In FIG. 1 of the attached drawing such a trace of movement of the center of rotation A of the wheel is shown for the conventional double wishbone type suspension by a straight line Wa and for the conventional trailing arm type suspension by an arcuate line Ta.

In the geometric analysis of the suspension with regard to the bounding and rebounding of the wheels it is noted that the traces of movement of two points are essential, one being the above-mentioned trace of movement of the center of rotation of the wheel, and the other being the trace of movement of a momentary ground contact point (point B in FIG. 1), that is a point on the wheel at which the wheel contacts the ground at each moment in a standard state of no bounding and no rebounding, these two traces of movement, in combination, determining the center of bounding and rebounding movement of the wheel supporting member relative to the vehicle body (point C in FIG. 1 and called "center of bounding and rebounding" hereinafter). The center of bounding and rebounding coincides with the front pivot point of the arm in the conventional trailing arm type suspension. However, the center of bounding and rebounding can be an imaginary point in the vehicle body through which act the driving and braking forces transmitted between the wheel and the vehicle body. In fact, in the conventional double wishbone type suspension, the center of bounding and rebounding is positioned infinitely forward of the suspension. The driving force applied from the engine to the wheel is reacted by the vehicle body through a line of force passing through the center of rotation of the wheel and said center of bounding and rebounding, while the braking force applied to the wheel is reacted by the vehicle body through a line of force passing through said momentary ground contact point and said center of bounding and rebounding. In FIG. 1, the traces of movement of the momentary ground contact point are shown by lines Wb and Tb for the conventional double wishbone type suspension and the conventional trailing arm type suspension, respectively.

Therefore, by taking the angle of inclination of the line of force in driving, i.e. the angle made by the line passing through the center of rotation and the center of bounding and rebounding with respect to a horizontal line, to be "a" (positive when the point C is higher than the point A), and the angle of inclination of the line of force in braking, i.e. the angle made by the line passing through said momentary ground contact point and the center of bounding and rebounding with respect to a horizontal line, to be "b" (probably always positive), in the rear wheel suspension, the effect of the driving force on the squatting is proportional to tan a, and the effect of the braking force on the nose diving (or a back lifting) is proportional to tan b.

Figure 2:
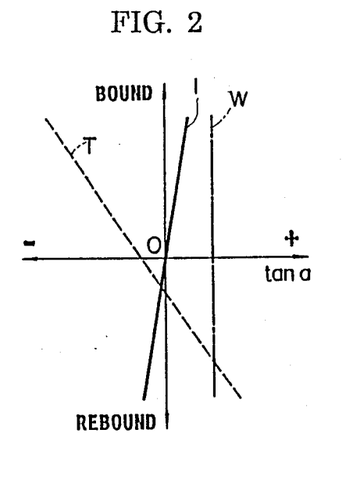
FIG. 2 is a diagram indicative of the effect of the driving force on the rolling of the vehicle body in turning of the vehicle under driving.
Figure 3:
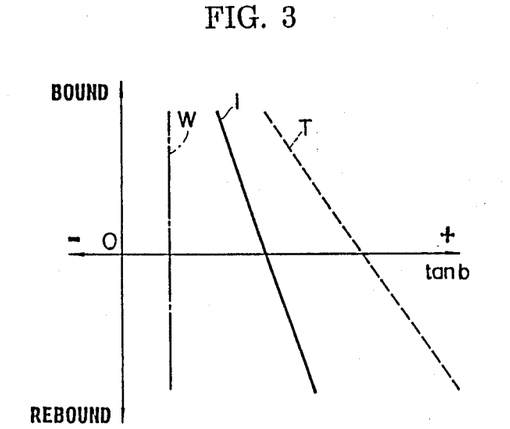
FIG. 3 is a diagram indicative of the effect of the braking force on the rolling of the vehicle body in turning of the vehicle under braking.

In FIG. 2, the effect of the driving force on the squatting is shown by a one dot line W for the conventional double wishbone type rear suspension and by a broken line T for the conventional trailing arm type rear suspension. Similarly, in FIG. 3, the effect of the braking force on the nose diving is shown by a one dot line W for the conventional double wishbone type rear suspension and by a broken line T for the conventional trailing arm type rear suspension.

The conventional wishbone type rear suspension is, if the inclination is appropriately designed, able to provide a constant anti-squatting effect and a constant anti-nose diving effect regardless of the bounding and rebounding of the wheel relative to the vehicle body. Therefore, however, this type of rear suspension has no effect of suppressing the rolling of the vehicle body in turning of the vehicle, regardless of driving and braking, although it has therefore no adverse effect on it. The conventional trailing arm type rear suspension has a desirable effect of suppressing the rolling of the vehicle body in turning of the vehicle under braking, although too much suppression of the rolling in turning under braking has an adverse effect of increasing the probability of vehicle spinning. However, the rear suspension of this type has an adverse effect on the rolling of the vehicle body in turning of the vehicle under driving, because the balance of the driving forces applied from a pair of rear wheels to the vehicle body always acts to promote the rolling of the vehicle body along with increase of the rolling.

SUMMARY OF THE INVENTION

The present invention is based upon the above-mentioned geometric analysis of the prior art vehicle suspension with a certain idea of effectively utilizing the driving and the braking force to accomplish a desirable control of the rolling of the vehicle body in turning of the vehicle.

Therefore, it is a primary object of the present invention to provide a rear suspension of a vehicle such as an automobile that can effectively utilize the braking force exerted between the rear wheel and the vehicle body for suppressing the rolling of the vehicle body in turning of the vehicle under braking at least with no substantial adverse effect being applied by the driving force exerted between the rear wheel and the vehicle body on the rolling of the vehicle body in turning of the vehicle under driving.

It is another object of the present invention to provide a rear suspension of a vehicle such as an automobile that can effectively utilize the braking force exerted between the rear wheel and the vehicle body for suppressing the rolling of the vehicle body in turning of the vehicle under braking, and also the driving force exerted between the rear wheel and the vehicle body for suppressing the rolling of the vehicle body in turning of the vehicle under driving.

In the various factors which determine the riding quality of a vehicle such as an automobile there is an interaction between the bounding and rebounding of the wheel relative to the vehicle body and an acceleration induced thereby in the vehicle body in its longitudinal direction. When the trace of movement of the center of rotation of the wheel makes an angle with respect to a vertical line passing through said center of rotation as seen in a side view of the vehicle, as the line Wa of the conventional double wishbone type suspension or the line Ta of the conventional trailing arm type suspension does in FIG. 1, in running of the vehicle (mostly under driving) the bounding and the rebounding of the wheel relative to the vehicle body causes the corresponding forward and rearward shifting of the vehicle body relative to the wheel, and accordingly, the corresponding forward and rearward reciprocating acceleration is induced in the vehicle body. Such a reciprocating longitudinal acceleration, even when it is small in the amount, gives a relatively great discomfort to the driver and passengers.

Therefore, it is still another object of the present invention to provide such a rear suspension of a vehicle that satisfies the above-mentioned primary object of the invention and further minimizes said interaction between the bounding and rebounding of the wheel and the forward and rearward reciprocation of the vehicle body.

It is a still further object of the present invention to provide such a rear suspension of a vehicle that satisfies the above-mentioned primary object of the invention and further optimizes the suppression of the rolling of the vehicle body in turning under braking in a manner of avoiding any increase of the probability of spinning of the vehicle.

The above-mentioned primary object of the present invention is accomplished by a rear suspension of a vehicle for mounting a rear wheel to a vehicle body in a manner of transmitting driving and braking forces therebetween while allowing bounding and rebounding of the rear wheel relative to the vehicle body, comprising: a wheel supporting member for supporting said rear wheel to be rotatable about a center of rotation, and a plurality of links each being pivotably connected at a first end thereof with said vehicle body at a determinate point thereof and at a second end thereof with said wheel supporting member at a determinate point thereof so as thereby in combination to define a first trace of movement of said center of rotation of said rear wheel relative to said vehicle body and a second trace of movement of a momentary ground contact point of said rear wheel relative to said vehicle body in the bounding and the rebounding of said rear wheel relative to said vehicle body, wherein an effective length of each said link between said first and second ends thereof and said determinate points in said vehicle body and in said wheel supporting member corresponding to each said link are so determined that, as seen in a side view of the vehicle, the point of intersection of a first normal line drawn to said first trace of movement with a second normal line drawn to said second trace of movement is, at a standard position thereof corresponding to no bounding and no rebounding of said rear wheel relative to said vehicle body, positioned on the front side of and at substantially the same level as said center of rotation of said rear wheel, said point of intersection shifting forward and upward from said standard position thereof along with the bounding of said rear wheel relative to said vehicle body and rearward and downward from said standard position thereof along with the rebounding of said rear wheel relative to said vehicle body.

In FIG. 1, said first trace of movement and said second trace of movement are shown by $Ia$ and $Ib$, respectively, said point of intersection at said standard position thereof is shown by $C_0$, and said point of intersection shifts from point $C_0$ to point $C_1$ when the wheel bounds relative to the vehicle body and to point $C_2$ when the wheel rebounds relative to the vehicle body.

The above-mentioned condition that the point of intersection between said first and second normal lines is positioned on a front side of and at substantially the same level as the center of rotation of said rear wheel at the standard position thereof corresponding to no bounding and no rebounding of the wheel and that said point of intersection shifts forward and upward from said standard position thereof along with the bounding of the wheel and rearward and downward from said standard position thereof along with the rebounding of the wheel corresponds to that the ratio of the rate of curvature of said first trace of movement to that of said second trace of movement is decreased as compared with the conventional trailing arm type suspension. Or, if the present invention is compared with the conventional double wishbone type suspension, the above-mentioned condition corresponds to that substantially only said second trace of movement is modified to be concavely arcuate toward the front of the vehicle.

By decreasing the rate of curvature of said first trace of movement starting from a certain design of the conventional trailing arm type suspension, the broken line in FIG. 2 turns clockwise in the figure, and when its curvature changes from the forwardly concave curve to the forwardly convex curve through zero curvature, the performance line expressed in FIG. 2 changes from of a negative inclination to of a positive inclination like the solid line I therein shown for an embodiment of the present invention. The adverse effect of the driving force exerted between the wheel and the vehicle body on the suppression of the rolling of the vehicle body in turning of the vehicle under driving is reduced along with the clockwise turning of a performance curve such as the broken line in FIG. 2 of the conventional trailing arm type rear suspension toward a vertical position, and when it is further turned clockwise to have a positive inclination like the solid line I, the driving force exerted between the wheel and the vehicle body has a positive effect of suppressing the rolling of the vehicle body in turning of the vehicle under driving. This positive effect of the driving force on suppressing the rolling of the vehicle body in turning of the vehicle under driving increases as the solid line is further turned clockwise. However, this also increases the aforementioned interaction between the bounding and rebounding of the wheel and the longitudinal reciprocation of the vehicle body. Therefore, an appropriate inclination such as that of the solid line I in FIG. 2 is desirable. In FIG. 1, the line I$a$ shows said first trace of movement corresponding to the solid line I in FIG. 2, and is slightly convex toward the front of the vehicle.

When said first trace of movement of the center of rotation of the wheel and said second trace of movement of said momentary ground contact point according to the bounding and rebounding of the wheel are determined with individual freedom so that the point of intersection between said first normal line drawn to said first trace of movement and said second normal line drawn to said second trace of movement shifts from the standard position thereof forward and upward along with the bounding of the wheel and rearward and downward along with the rebounding, it is possible to determine said second trace of movement of said momentary ground contact point to have a relatively moderate curvature as compared with that in the conventional trailing arm type suspension as shown by line I$b$ in FIG. 1. By such an arrangement the effect of the braking on the suppression of the rolling in turning of the vehicle can be determined to be optimum as shown by a solid line I in FIG. 3, avoiding any increase of the probability of vehicle spinning.

In view of the above, and as will be understood from the following descriptions on several embodiments of the present invention, further detailed constructions of the rear suspension according to the present invention are summarized as follows:

First, said links may desirably be so arranged that said first trace of movement of said center of rotation is arcuate to be convex toward the front.

Further, said first normal line drawn to said first trace of movement from said point of intersection at said standard position thereof may desirably be substantially horizontal.

In a more detail construction, said links may comprise an upper A-type arm pivotably connected at two foot ends thereof with the vehicle body at a first and a second point thereof to define a first pivot axis passing through said first and second points and at an apex end thereof with said wheel supporting member, and a lower A-type arm pivotably connected at two foot ends thereof with the vehicle body at a third and a fourth point thereof to define a second pivot axis passing through said third and fourth points and at an apex end thereof with said wheel supporting member, said first pivot axis being inclined to descend in the front and to ascend in the rear as viewed in said side view, said second pivot axis being inclined to ascend in the front and to descend in the rear as viewed in said side view.

In the above construction, said first pivot axis may desirably be inclined to approach a longitudinal central portion of the vehicle body in the front and to depart from said longitudinal central portion of the vehicle body in the rear as viewed from a top of the vehicle, and said second pivot axis may desirably be inclined to depart from said longitudinal central portion of the vehicle body in the front and to approach said longitudinal central portion of the vehicle body in the rear as viewed from a top of the vehicle.

In a second more detailed construction, said links may comprise an upper A-type arm pivotably connected at two foot ends thereof with the vehicle body at a first and a second point thereof to define a first pivot axis passing through said first and second points and at an apex end thereof with said wheel supporting member at a first point thereof, a lower inverse A-type arm pivotably connected at an apex end thereof with the vehicle body at a third point thereof and at two foot ends thereof with said wheel supporting member at a second point thereof and a third point thereof positioned on the rear side of said second point, and an I-type arm pivotably connected at an inner end thereof with the vehicle body at a fourth point thereof spaced from said third point on the rear side thereof to define a second pivot axis passing through said third and fourth points thereof and at an outer end thereof with said wheel supporting member at a fourth point thereof close to said third point thereof and aligned with said first and third points on said wheel supporting member to define a steering axis of said wheel supporting member, said first pivot axis being inclined to descend in the front and to ascend in the rear as viewed in said side view, said second pivot axis being inclined to ascend in the front and to descend in the rear as viewed in said side view.

In the above second detailed construction, said first pivot axis may desirably be inclined to approach a longitudinal central portion of the vehicle body in the front and to depart from said longitudinal central portion of the vehicle body in the rear as viewed from a top of the vehicle, and said second pivot axis may desirably be inclined to depart from said longitudinal central portion of the vehicle body in the front and to approach said longitudinal central portion of the vehicle body in the rear as viewed from a top of the vehicle.

Further, in the above second detailed construction, said steering axis can desirably be positioned to be relatively close to said center of rotation of the wheel.

Further, in the above second detailed construction, by taking the distance between said third and fourth points to be $L_1$, the distance between said sixth and seventh points to be $L_2$, the distance between said point of intersection at said standard position thereof and said second point on said wheel supporting member to be $r_1$, and the distance between said point of intersection at said standard position thereof and said fourth point on said wheel supporting member to be $r_2$, the ratio $L_1/L_2$ may desirably be substantially equal to the ratio $r_1/r_2$.

In a third more detailed construction, said links may comprise a first substantially I-type link pivotably connected at an inner end thereof with the vehicle body at a first point thereof and at an outer end thereof with said wheel supporting member at a first point thereof, a second substantially I-type link pivotably connected at an inner end thereof with the vehicle body at a second point thereof positioned on the rear side of said first point thereof and at an outer end thereof with said wheel supporting member at a second point thereof positioned on the rear side of said first point thereof, a third substantially I-type link pivotably connected at an inner end thereof with the vehicle body at a third point thereof positioned under said first point thereof and at an outer end thereof with said wheel supporting member at a third point thereof positioned under said first point thereof, a fourth substantially I-type link pivotably connected at an inner end thereof with the vehicle body at a fourth point thereof positioned under said second point thereof and on the rear side of said third point thereof and at an outer end thereof with said wheel supporting member at a fourth point thereof positioned under said second point thereof and on the rear side of said third point thereof, and a fifth substantially I-type link pivotably connected at an inner end thereof with the vehicle body at a fifth point thereof positioned at a level between said first and third points thereof and generally on the front side of said first and third points thereof and at an outer end thereof with said wheel supporting member at a fifth point thereof positioned at a level between said first and third points thereof and on the front side of said first and third points thereof, the distance between said first and second points on the vehicle body being generally larger than the distance between said first and second points on said wheel supporting member, the distance between said third and fourth points on the vehicle body being generally larger than the distance between said third and fourth points on said wheel supporting member, an effective length of said first link between the opposite pivot ends thereof being equal to or larger than an effective length of said second link between the opposite pivot ends thereof, an effective length of said third link between the opposite pivot ends thereof being larger than an effective length of said fourth link between the opposite pivot ends thereof.

In the following the present invention will be described with respect to some preferred embodiments with reference to the accompanying drawings.

BRIEF DESCRIPTION OF THE DRAWINGS

In the accompanying drawings.

DESCRIPTION OF THE PREFERRED EMBODIMENTS

In the present specification, expressions such as "front", "rear", "forward", "rearward", "right", "left", "up", "down", "upper", "lower" or the like are all based upon the common sense in respect to the nominal orientation with regard to a vehicle like an automobile placed on a generally horizontal ground. Further, the white arrows in the figures show the forward direction of the vehicle.

Figure 4:
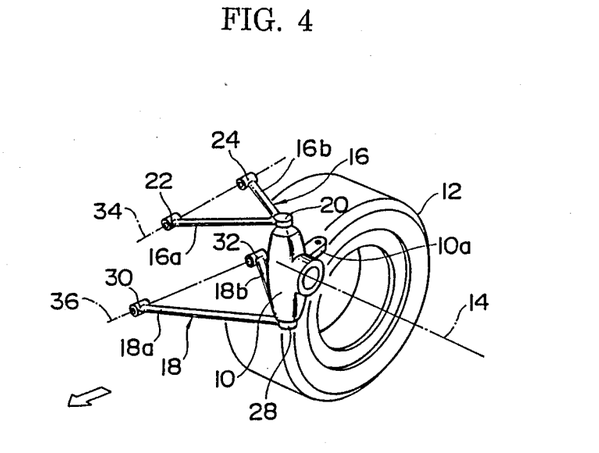
FIG. 4 is a perspective view of a first embodiment of the rear suspension according to the present invention.
Figure 5:
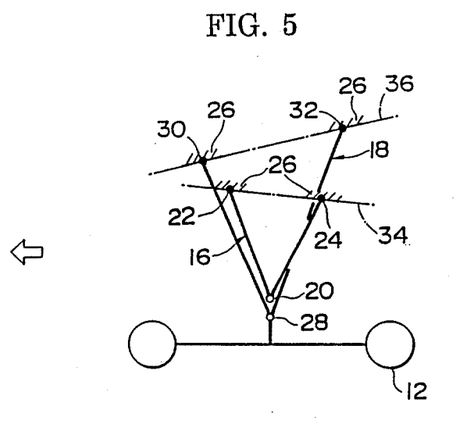
FIG. 5 is a plan view in schematic illustration of the rear suspension shown in FIG. 4.
Figure 6:
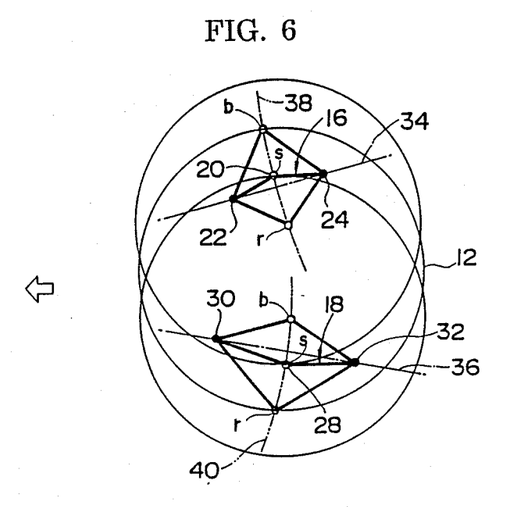
FIG. 6 is a side view in schematic illustration of the rear suspension shown in FIG. 4.

Referring to FIGS. 4-6, the rear suspension of a vehicle according to the present invention is constructed in the form of a double wishbone type suspension employing an A-type upper arm 16 and an A-type lower arm 18 which in combination support a wheel supporting member 10 having a bearing construction for supporting a axle (not shown) to be rotatable about an axis of rotation 14 of a wheel 12 only shown by a tire portion thereof. The A-type upper arm 16 has two leg portions 16a and 16b and is pivotably connected with the wheel supporting member 10 at its apex end via a ball joint 20 and with a vehicle body 26 (FIG. 5) at its two foot ends via pivot joints 22 and 24 arranged to define a pivot axis 34. Similarly, the A-type lower arm 18 has two leg portions 18a and 18b and is pivotably connected with the wheel supporting member 10 at its apex end via a ball joint 28 and with the vehicle body 26 at its two foot ends via pivot joints 30 and 32 arranged to define a pivot axis 36.

In these figures the spring and the damper unit to be incorporated in the suspension according to the conventional structure are omitted for the clarity of the illustration, because any particular structure of such a unit would not substantially affect the construction of the present invention. The wheel supporting member has an arm 10a for connection with a control rod for controlling the toeing of the wheel. However, such a toe control system is also omitted from illustration, because such a toe control system does not affect either the essential construction of the invention. In view of the direction of the white arrow the suspension herein shown is a left side rear suspension.

As seen in FIG. 6, which is a side view of the suspension and therefore corresponds to a side view of the vehicle, a phantom line 38 is a trace of movement of the ball joint 20 according to up and down swinging of the upper arm 16 due to bounding and rebounding of the wheel, and a phantom line 40 is a trace of movement of the ball joint 28 according to up and down swinging of the lower arm 18 due to bounding and rebounding of the wheel. The inclination of the trace of movement 38 from a standard point "s" corresponding to no bounding and no rebounding of the wheel upward and forward to a point of bounding "b" corresponding a bounding of the wheel and downward and rearward to a point of rebounding "r" corresponding to a rebounding of the wheel is generated by inclining the pivot axis 34 to descend in the front and to ascend in the rear as seen in a side of the vehicle like FIG. 6.

Similarly, the inclination of the trace of movement 40 from a standard point "s" corresponding to no bounding and no rebounding of the wheel upward and rearward to a point of bounding "b" corresponding a bounding of the wheel and downward and forward to a point of rebounding "r" corresponding to a rebounding of the wheel is generated by inclining the pivot axis 36 to ascend in the front and to descend in the rear as in a side of the vehicle like FIG. 6.

The curvature of the trace of movement 38 convex toward the front is generated by inclining the pivot axis 34 as viewed from a top of the vehicle as shown in FIG. 5 so as to approach the longitudinal center of the vehicle in the front and to depart from the longitudinal center of the vehicle in the rear. Similarly, the curvature of the trace of movement 40 concave toward the front is generated by inclining the pivot axis 36 as viewed from a top of the vehicle as shown in FIG. 5 so as to depart from the longitudinal center of the vehicle in the front and to approach the longitudinal center of the vehicle in the rear.

By the combination of the traces of movement 38 and 40 delimiting the movement of the upper and the lower portion of the wheel supporting member 10, when the two A-type arms 16 and 18 swing up and down according to the bounding and rebounding of the wheel relative to the vehicle body, the axis 14 or the center of rotation of the wheel moves along a line such as the line $Ia$ in FIG. 1 which is slightly convex toward the front resulted from the balance between a generally forward movement of the upper end portion of the wheel supporting member 10 and a generally rearward movement of the lower end portion of the wheel supporting member 10 along with the bounding of the wheel, and the balance between a generally rearward movement of the upper end portion of the wheel supporting member 10 and a generally forward movement of the lower end portion of the wheel supporting member 10 along with the rebounding of the wheel, whereas, since the wheel supporting member 10 is turned anti-clockwise along with the bounding and clockwise along with the rebounding of the wheel as viewed in FIG. 6, said momentary ground contact point B moves along a curved line such as the line $Ib$ in FIG. 1.

It will be appreciated that a wide variety of combination of the rates of curvature is available for said first trace of movement of the center of rotation of the wheel and said second trace of movement of said momentary ground contact point to accomplish a most desirable performance of the rear suspension for each particular design of the vehicle.

FIGS. 7-10 show a second embodiment of the rear suspension according to the present invention constructed also as a kind of double wishbone type suspension. This embodiment employs an A-type arm 16 for the upper arm but employs an inverse A-type arm 62 and an I-type arm 64 in combination for the lower arm structure. The details with regard to the upper arm and the pivot connections related with the upper arm are substantially the same as in the first embodiment shown in FIGS. 4-6, and therefore the portions corresponding to those shown in FIGS. 4-6 are indicated by the same reference numerals as in FIGS. 4-6, and further detailed descriptions for these portions will be omitted.

In the lower arm structure, the wheel supporting member 10 is correspondingly modified to have two pivot points 66 and 68 for pivoting connection with two foot ends of two leg portions 62a and 62b of the inverse A-type arm 62, and a pivot point 72 for pivoting connection with an outside end of the I-type arm 64. The apex portion of the inverse A-type arm 62 is pivotably connected with the vehicle body 26 at a pivot point 70, whereas the inside end of the I-type arm 64 is pivotably connected with the vehicle body at a pivot point 74, thereby defining a pivot axis 36 corresponding to the same numbered pivot axis 36 in the embodiment shown in FIGS. 4-6 for pivoting the lower arm assembly made of the inverse A-type arm 62 and the I-type arm 64. Further, the pivot point 68 between the rear side leg 62b and the wheel suspension member 10 and the pivot point 72 between the I-type arm 64 and the wheel supporting member 10 are arranged to align with one another and further with the pivot point of the ball joint 20 pivotably connecting the apex end of the upper A-type arm 16 with the wheel supporting member 10 to define a substantially vertical pivot axis 76 about which the wheel supporting member 10 can rotate in the steering manner. Therefore, the suspension of this embodiment is applicable to a steerable rear wheel so that the wheel supporting member 10 is turned about the pivot axis 76 serving as a steering axis like the so-called king pin.

Figure 9:
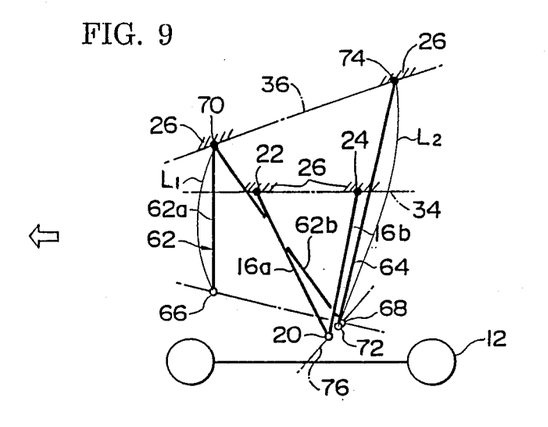
FIG. 9 is a plan view in schematic illustration of the rear suspension shown in FIG. 7.
Figure 10:
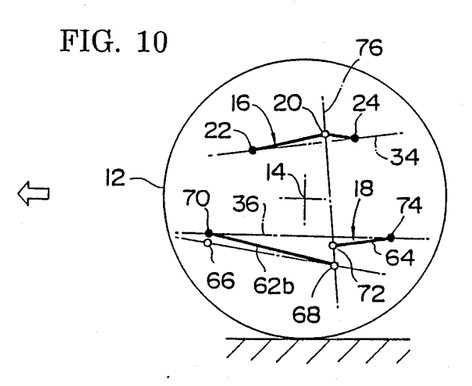
FIG. 10 is a side view in schematic illustration of the rear suspension shown in FIG. 7.

As seen in FIG. 10, also in this embodiment the pivot axis 34 of the A-type upper arm 16 is inclined to descend in the front and to ascend in the rear, and the pivot axis 36 of the lower arm structure made of the inverse A-type arm 62 and the I-type arm 64 is inclined, though slightly, to ascend in the front and to descend in the rear. As seen in FIG. 9, the pivot axis 34 of the upper A-type arm 62 is substantially parallel with a longitudinal axis of the vehicle (not shown), but the pivot axis 36 of the lower arm structure made of the inverse A-type arm 62 and the I-type arm 64 is substantially inclined to depart from the longitudinal center of the vehicle in the front and to approach the longitudinal center of the vehicle in the rear.

Figure 7:
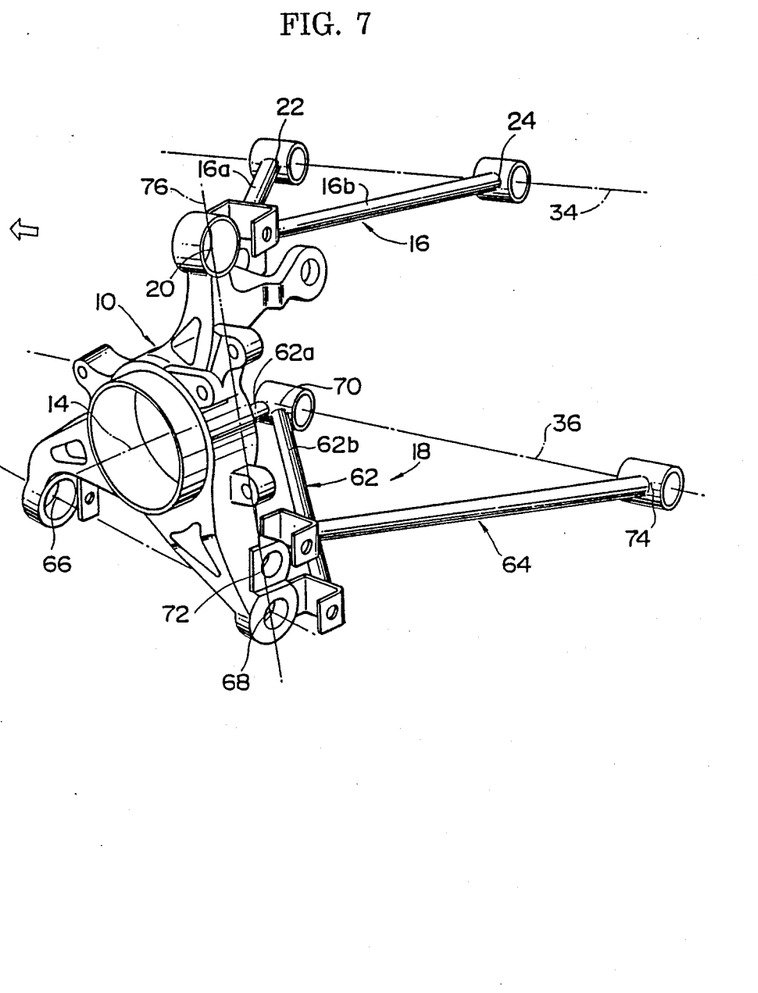
FIG. 7 is a perspective view of a second embodiment of the rear suspension according to the present invention.

Further, in this second embodiment, the aforementioned substantially vertical pivot axis 76 about which the wheel supporting member 10 is capable to turn in a steering manner is relatively close to the axis of rotation 14 of the wheel, whereas the pivot point 66 of the pivot connection between the wheel supporting member 10 and the front arm 62a of the inverse A-type arm is relatively remote from the axis of rotation 14, and therefore, the stability of the wheel supporting member 10 against being erroneously steered by side forces applied to the wheel is high as compared with a substantially symmetrical wishbone type suspension. The rigidity of a triangle structure available by the combination of the inverse A-type arm 62 and the wheel supporting member 10 also contributes to the above-mentioned steering stability of the wheel. By this arrangement, a highly stable steering of the wheel is available if an appropriate shifting system is incorporated for the pivot point 70 so as selectively to move the pivot point 70 along the pivot axis 36.

Figure 8:
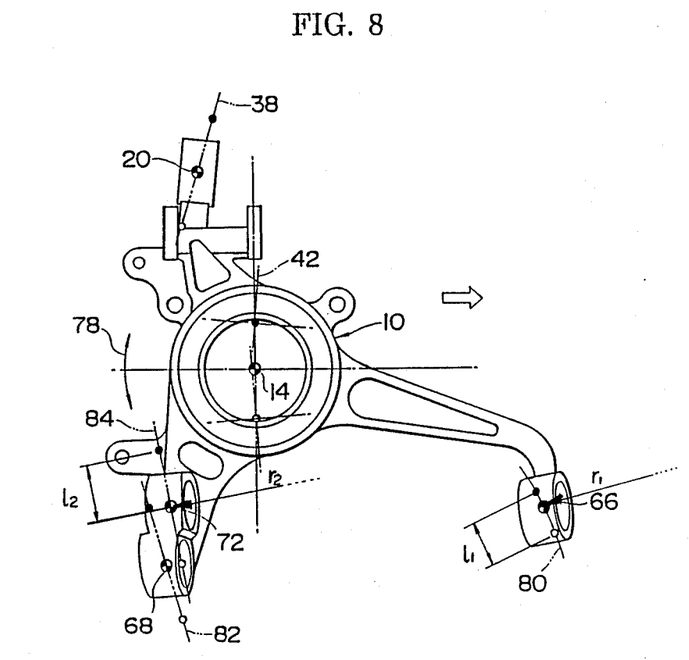
FIG. 8 is a side view seen from the inside toward the outside of the vehicle of the wheel supporting member in the rear suspension shown in FIG. 7.

Further, in this second embodiment, referring to FIG. 8, when the wheel bounds and rebounds, the wheel supporting member 10 moves up and down as shown by the oppositely headed arrow 78 about the center of bounding and rebounding positioned far away on the front side thereof, and in accordance with this the axis of rotation 14 and the pivot points 20, 66, 68 and 72 move to draw traces of movement as shown by 42, 38, 80, 82 and 84, respectively, all these traces of movement being centered at said center of bounding and rebounding positioned rightward as viewed in FIG. 9 but not shown in the figure. Since the pivot point 66 is positioned closer to the center of bounding and rebounding than the pivot point 72, the amplitude of movement $l_1$ of the pivot point 66 is smaller than the amplitude of movement $l_2$ of the pivot point 72. In a vehicle such as an automobile, if the toeing of the rear wheel changes so much toward toe-out direction as shown by a curve 86 in FIG. 11 according to the bounding and rebounding of the wheel, the cornering power of the rear wheel lowers, thereby causing a loss of the steering ability of the vehicle, whereas, if the toeing of the rear wheel changes so much toward toe-in direction as shown by a curve 88 in FIG. 11 according to the bounding and rebounding of the wheel, a running instability such as the bump steer is apt to occur.

Figure 11:
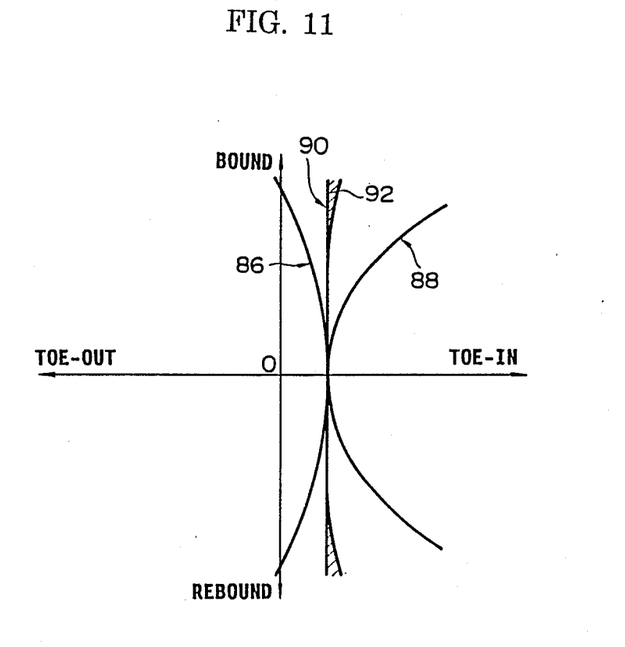
FIG. 11 is a diagram illustrating changes of the toeing according to the bounding and rebounding of the wheel.

In this connection, if the effective length $L_1$ of the leg portion 62a of the inverse A-type arm 62 (= distance between pivot points 66 and 70) and the effective length $L_2$ of the I-type arm 64 (= distance between pivot points 72 and 74) are so determined that the ratio $L_1/L_2$ is equal to $l_1/l_2$, the change of the toeing of the wheel according to the bounding and rebounding of the wheel is maintained to follow a substantially straight line 90 in FIG. 11, so that the toeing does not change according to the bounding and rebounding of the wheel. Thus it is recommended that, when the rear suspension according to the present invention is constructed in the form of said second embodiment having the lower arm structure made of the inverse A-type arm 62 and the I-type arm 64, the effective length $L_1$ of the leg portion 62a is determined relative to the effective length $L_2$ of the I-type arm 64 so as to satisfy the above-mentioned condition or to be slightly shorter than that so that the change of toeing of the wheel is within such a range as indicated by a hatched area 92. The ratio $l_1/l_2$ is generally proportional to the ratio of the distance $r_1$ between said center of bounding and rebounding at no bounding and no rebounding of the wheel and the pivot point 66 to the distance $r_2$ between said center of bounding and rebounding at no bounding and no rebounding of the wheel and the pivot point 72.

Figure 12:
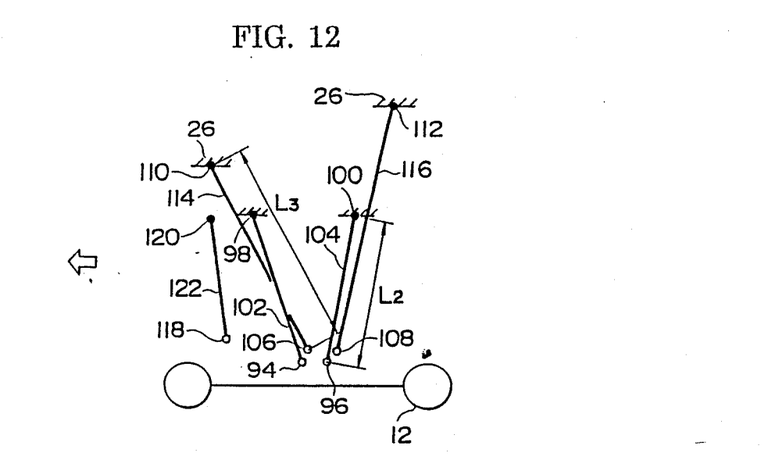
FIG. 12 is a plan view in schematic illustration of a third embodiment of the rear suspension according to the present invention.
Figure 13:
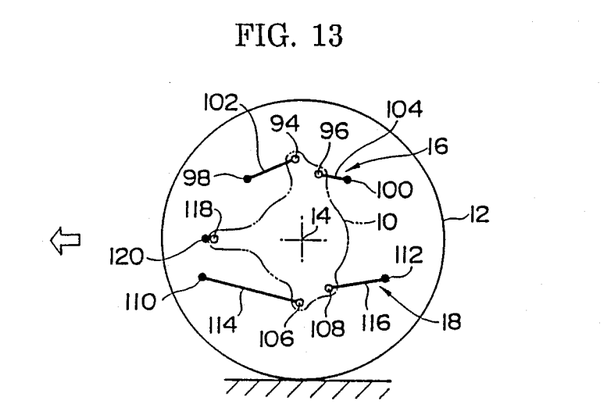
FIG. 13 is a side view in schematic illustration of the rear suspension shown in FIG. 12.
Figure 14:
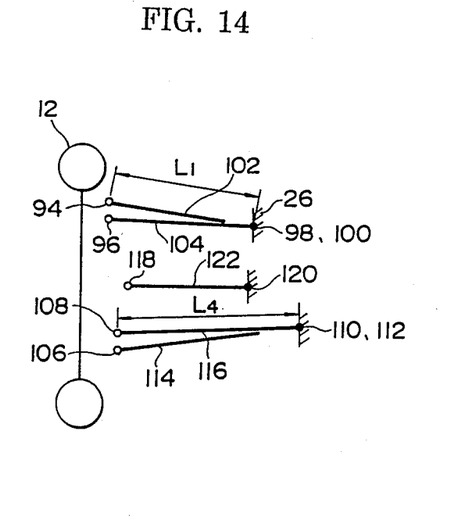
FIG. 14 is an end view in schematic illustration of the rear suspension shown in FIG. 12 seen from the right-side thereof toward the leftside thereof in FIG. 12.

FIGS. 12–14 show a third embodiment of the rear suspension according to the present invention. In this embodiment the links are formed as a set of five independent I-type links each being pivotably connected at an outer end thereof with the wheel supporting member 10 and at an inner end thereof with the vehicle body 26. So, as shown in the figures, a first link 102 is pivotably connected with the wheel supporting member 10 at a pivot point 94 and with the vehicle body 26 at a pivot point 98, a second link 104 is pivotably connected with the wheel supporting member 10 at a pivot point 96 and with the vehicle body 26 at a pivot point 100, a third link 114 is pivotably connected with the wheel supporting member 10 at a pivot point 106 and with the vehicle body 26 at a pivot point 110, a fourth link 116 is pivotably connected with the wheel supporting member 10 at a pivot point 108 and with the vehicle body 26 at a pivot point 112, and a fifth link 122 is pivotably connected with the wheel supporting member 10 at a pivot point 118 and with the vehicle body 26 at a pivot point 120.

Although all these five links operate in certain determinate mutual correlation according to the geometric limitations, the first link 102 and the second link 104 operate generally to correspond to the A-type upper arm 16 in the first embodiment shown in FIGS. 4–6, with the first link 102 corresponding to the front leg portion 16a while the second link 104 corresponding to the rear leg portion 16b of the A-type arm 16, so that the distance between the pivot points 94 and 96 with the wheel supporting member 10 is smaller than the distance between the pivot points 98 and 100 with the vehicle body 26, and the third link 114 and the fourth link 116 operate generally to correspond to the A-type lower arm 18 in the first embodiment shown in FIGS. 4–6, with the third link 114 corresponding to the front leg portion 18a while the fourth link 116 corresponding to the rear leg portion 18b of the A-type arm 18, so that the distance between the pivot points 106 and 108 with the wheel supporting member 10 is smaller than the pivot points 110 and 112 with the vehicle body 26. The increased freedom of movement of the link mechanism by the first through fourth links 104–116 due to the freedom between the first link 104 and the second link 104 and the freedom between the third link 114 and the fourth link 116 as compared with the A-type links 16 and 18 is compensated for by the fifth link 122 positioned generally on the front side of the first through fourth links generally at the same level as the axis of rotation 14 of the wheel 12.

In this multi-link system, the two factors in the movement of the wheel supporting member 10 important from the view point of the present invention according to the bounding and rebounding of the wheel relative to the vehicle wheel, i.e. the first trace of movement of the center of rotation and the second trace of movement of said momentary ground contact point, are controllable by the three dimensional relative positions of all pivot points such as 94, 96, ..., wherein some of those three dimensional relative positions such as the distance between the pivot point 94 and the pivot point 98 is of course determined by the effective length of a link such as the link 102. Although a wide variety of design will be possible with regard to the length of each link and the positions of the opposite pivot ends thereof to construct the rear suspension according to the present invention, it will be seen from the similarity of the geometric configuration in the plan view of FIGS. 5 and 12 that one of such useful conditions would be by denoting the effective lengths of the first through fourths links 102, 104, 114 and 116 by $L_1$, $L_2$, $L_3$ and $L_4$, respectively, that $L_1$ is greater than or substantially equal to $L_2$ and $L_3$ is smaller than $L_4$.

Although the present invention has been described in detail with respect to some preferred embodiments thereof with reference to the accompanying drawings, it will be noted by those skilled in the art that various modifications with regard to the shown embodiments are possible without departing from the spirit of the present invention.

I claim:

1. A rear suspension of a vehicle for mounting a rear wheel to a vehicle body in a manner of transmitting driving and braking forces therebetween while allowing bounding and rebounding of the rear wheel relative to the vehicle body, comprising: a wheel supporting member for supporting said rear wheel to be rotatable about a center of rotation, and a plurality of links each being pivotably connected at a first end thereof with said vehicle body at a determinate point thereof and at a second end thereof with said wheel supporting member at a determinate point thereof so as thereby in combination to define a first trace of movement of said center of rotation of said rear wheel relative to said vehicle body and a second trace of movement of a momentary ground contact point of said rear wheel relative to said vehicle body in the bounding and the rebounding of said rear wheel relative to said vehicle body, wherein an effective length of each said link between said first and second ends thereof and said determinate points in said vehicle body and in said wheel supporting member corresponding to each said link are so determined that, as seen in a side view of the vehicle, the point of intersection of a first normal line drawn to said first trace of movement with a second normal line drawn to said second trace of movement is, at a standard position thereof corresponding to no bounding and no rebounding of said rear wheel relative to said vehicle body, positioned on the front side of and at substantially the same level as said center of rotation of said rear wheel, said point of intersection shifting forward and upward from said standard position thereof along with the bounding of said rear wheel relative to said vehicle body and rearward and downward from said standard position thereof along with the rebounding of said rear wheel relative to said vehicle body.

2. A rear suspension according to claim 1, wherein said links are so arranged that said first trace of movement of said center of rotation is arcuate to be convex toward the front.

3. A rear suspension according to claim 1, wherein said first normal line drawn to said first trace of movement from said point of intersection at said standard position thereof is substantially horizontal.

4. A rear suspension according to claim 1, wherein said links comprise an upper A-type arm pivotably connected at two foot ends thereof with the vehicle body at a first and a second point thereof to define a first pivot axis passing through said first and second points and at an apex end thereof with said wheel supporting member, and a lower A-type arm pivotably connected at two foot ends thereof with the vehicle body at a third and a fourth point thereof to define a second pivot axis passing through said third and fourth points and at an apex end thereof with said wheel supporting member, said first pivot axis being inclined to descend in the front and to ascend in the rear as viewed in said side view, said second pivot axis being inclined to ascend in the front and to descend in the rear as viewed in said side view.

5. A rear suspension according to claim 4, wherein said first pivot axis is inclined to approach a longitudinal central portion of the vehicle body in the front and to depart from said longitudinal central portion of the vehicle body in the rear as viewed from a top of the vehicle, and said second pivot axis is inclined to depart from said longitudinal central portion of the vehicle body in the front and to approach said longitudinal central portion of the vehicle body in the rear as viewed from a top of the vehicle.

6. A rear suspension according to claim 1, wherein said links comprise an upper A-type arm pivotably connected at two foot ends thereof with the vehicle body at a first and a second point thereof to define a first pivot axis passing through said first and second points and at an apex end thereof with said wheel supporting member at a first point thereof, a lower inverse A-type arm pivotably connected at an apex end thereof with the vehicle body at a third point thereof and at two foot ends thereof with said wheel supporting member at a second point thereof and a third point thereof positioned on the rear side of said second point, and an I-type arm pivotably connected at an inner end thereof with the vehicle body at a fourth point thereof spaced from said third point thereof on the rear side thereof to define a second pivot axis passing through said third and fourth points thereof and at an outer end thereof with said wheel supporting member at a fourth point thereof close to said third point thereof and aligned with said first and third points on said wheel supporting member to define a steering axis of said wheel supporting member, said first pivot axis being inclined to descend in the front and to ascend in the rear as viewed in said side view, said second pivot axis being inclined to ascend in the front and to descend in the rear as viewed in said side view.

7. A rear suspension according to claim 6, wherein said first pivot axis is inclined to approach a longitudinal central portion of the vehicle body in the front and to depart from said longitudinal central portion of the vehicle body in the rear as viewed from a top of the vehicle, and said second pivot axis is inclined to depart from said longitudinal central portion of the vehicle body in the front and to approach said longitudinal central portion of the vehicle body in the rear as viewed from a top of the vehicle.

8. A rear suspension according to claim 7, wherein said steering axis is relatively close to said center of rotation of the wheel.

9. A rear suspension according to claim 7, wherein, by taking the distance between said third point on the vehicle body and said second point on said wheel supporting member to be $L_1$, the distance between said fourth point on the vehicle body and said fourth point on said wheel supporting member to be $L_2$, the distance between said point of intersection at said standard position thereof and said second point on said wheel supporting member to be $r_1$, and the distance between said point of intersection at said standard position thereof and said fourth point on said wheel supporting member to be $r_2$, the ratio $L_1/L_2$ is substantially equal to the ratio $r_1/r_2$.

10. A rear suspension according to claim 1, wherein said links comprise a first substantially I-type link pivotably connected at an inner end thereof with the vehicle body at a first point thereof and at an outer end thereof with said wheel supporting member at a first point thereof, a second substantially I-type link pivotably connected at an inner end thereof with the vehicle body at a second point thereof positioned on the rear side of said first point thereof and at an outer end thereof with said wheel supporting member at a second point thereof positioned on the rear side of said first point thereof, a third substantially I-type link pivotably connected at an inner end thereof with the vehicle body at a third point thereof positioned under said first point thereof and at an outer end thereof with said wheel supporting member at a third point thereof positioned under said first point thereof, a fourth substantially I-type link pivotably connected at an inner end thereof with the vehicle body at a fourth point thereof positioned under said second point thereof and on the rear side of said third point thereof and at an outer end thereof with said wheel supporting member at a fourth point thereof positioned under said second point thereof and on the rear side of said third point thereof, and a fifth substantially I-type link pivotably connected at an inner end thereof with the vehicle body at a fifth point thereof positioned at a level between said first and third points thereof and generally on the front side of said first and third points thereof and at an outer end thereof with said wheel supporting member at a fifth point thereof positioned at a level between said first and third points thereof and on the front side of said first and third point thereof, the distance between said first and second points on the vehicle body being generally larger than the distance between said first and second points on said wheel supporting member, the distance between said third and fourth points on the vehicle body being generally larger than the distance between said third and fourth points on said wheel supporting member, an effective length of said first link between the opposite pivot ends thereof being equal to or larger than an effective length of said second link between the opposite pivot ends thereof, an effective length of said third link between the opposite pivot ends thereof being smaller than an effective length of said fourth link between the opposite pivot ends thereof.

* * * * *